United States Patent [19]

Wada

[11] 4,097,904
[45] Jun. 27, 1978

[54] OPTICAL READ HEAD

[75] Inventor: Tasaku Wada, Narita, Japan

[73] Assignee: Kokusai Denshin Denwa Co., Ltd., Tokyo, Japan

[21] Appl. No.: 794,315

[22] Filed: May 5, 1977

[30] Foreign Application Priority Data

May 15, 1976 Japan .................................. 51-54814

[51] Int. Cl.² .......................... H04N 1/12; G02B 5/16
[52] U.S. Cl. .................................. 358/294; 350/96.24; 355/1; 358/285; 358/901
[58] Field of Search ........................ 358/294, 901, 285; 350/96 R, 96 B; 355/1

[56] References Cited

U.S. PATENT DOCUMENTS

| 3,899,035 | 8/1975 | Rothgordt | 358/294 |
| 3,956,587 | 5/1976 | Nelson | 358/901 |

*Primary Examiner*—Howard W. Britton
*Attorney, Agent, or Firm*—Armstrong, Nikaido, Marmelstein & Kubovcik

[57] ABSTRACT

A read head for scanning the image information on an original paper, having an optical fiber assembly having a plurality of light emission fibers for emitting a light beam onto the original paper and a light receiving fiber for receiving the reflected light from said original paper, a transparent plate having an opaque film with a small hole mounted at the extreme end of said optical fiber assembly, the other extreme end of said light emission fiber and light receiving fiber in said optical fiber assembly being positioned in front of a light source and a light detector element, respectively, and said transparent plate being positioned in contact with or near the original paper to be scanned.

3 Claims, 12 Drawing Figures

OPTICAL READ HEAD

BACKGROUND OF THE INVENTION

The present invention relates to a read-head provided with optical fibers for reading image information, and more particularly, relates to a read-head for reading information on the face of the original paper in a facsimile system.

In a facsimile system or an OCR (Optical Character Reader), the information on an original paper is read by a read-head which operates on an optical principle. One of the conventional optical read-heads is shown in the U.S. Pat. application Ser. No. 770,784. Said optical read-head has a plurality of thick emission fibers and a thin receiving fiber. The extreme end of the emission fiber faces a lamp, and the extreme end of the receiving fiber faces a photo-electric convertor. The extreme opposite end of both the emission fiber and the receiving fiber operates as the optical read-head. The lamp illuminates the surface of the original paper through the emission fiber, and the receiving fiber reads the reflected brightness from the original paper thus illuminated. The resolving power of said optical read-head is shown:

$$D = d + 2h \cot \theta$$

where D is the diameter of the area where the read-head actually reads, $d$ is the diameter of the receiving fiber, $h$ is the distance between the end of the receiving fiber and the surface of the original paper, and $\theta$ is approximate sixty degrees for an ordinary optical fiber. Of course, the smaller the value D is, the higher the resolving power. Since the value $h$ can not be zero since a read-head with $h=0$ will be distorted by friction or friction heat, in order to improve the resolving power of a prior read-head, the value $d$ was make as small as possible. Thus, the receiving fiber in a prior read-head is exceedingly thin, as compared with the emission fiber, requiring the utmost care and the costs for manufacturing the same are extremely high. A prior receiving fiber has another disadvantage that its mechanical strength is poor and the light beam passing through a receiving fiber is considerably attenuated in the thin fiber.

SUMMARY OF THE INVENTION

It is an object, therefore, of the present invention to overcome the disadvantages and limitations of a prior optical read-head by providing a new and improved optical read-head.

The above and other objects are attained by an optical read-head having a plurality of light emission fibers and a light receiving fiber, a transparent plate having an opaque film with a small hole mounted at the extreme end of the fiber assembly including both the light emission fiber and the light receiving fiber. Said fiber assembly is usually flexible and one end of the light emission fiber is positioned in front of a light source, and one end of the light receiving fiber is positioned in front of a light detector element.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENTS

First, a facsimile system which can utilize the present optical read-head will be explained in accordance with FIGS. 1 through 6, and the prior optical read-head will be explained in accordance with FIGS. 7, 8 and 9, to facilitate understanding of the present invention.

Figure 1:
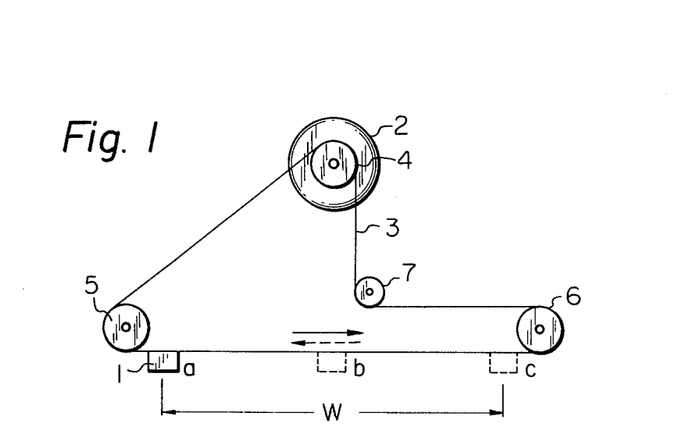
FIG. 1 shows the structure of the main scanning system of the facsimile apparatus using the present read-head.

FIG. 1 shows the plane view of the main part of the facsimile system using the read-head according to the present invention. The reference numeral 1 is the carrier which carries the write-head and the read-head, and is fixed movably on the belt 3, which is held with tension by the pulleys 4 through 7. The pulley 4 is connected to the axis of the main scanning motor 2. When the main pulse motor 2 rotates in the forward or reverse direction, the carrier 1 moves linearly from (a) through (b) to (c), and from (c) through (b) to (a). The length W between (a) and (c) is equal to the width of the original or printing paper. The read-head and/or the write head scans the paper in accordance with the movement of the carrier 1.

Figure 2:
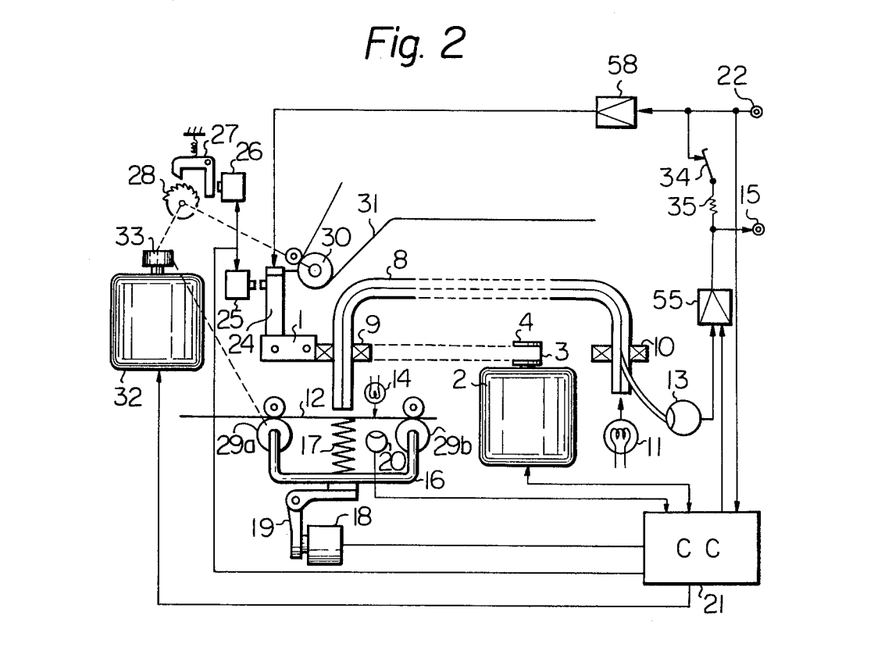
FIG. 2 is the mechanical structure of the facsimile apparatus using the present read-head.

FIG. 2 shows the mechanical structure of the facsimile system using the present read-head. One end of the optical fiber assembly 8 is supported by the bearing 9 on the carrier 1, and faces the original paper 12, thus functioning as a read-head. The other end of said optical fiber is supported by the bearing 10 and faces the lamp 11 and the photo detector 13. The write head 24 faces the printing paper 31. The pulse motor 2 for the main scanning drives the carrier 1 via the belt 3. The other pulse motor 32 is for the auxiliary scanning and has a pulley 33 at the axis of the same. Said pulley 33 is connected to the roller 29a for supplying an original paper, the ratchet gear 28 and the roller 30 for supplying a printing paper. As mentioned above, a single drive means comprising pulsemotors 2 and 32 in FIG. 2, can operate the main and the auxiliary scanning in both the transmission and the receiving modes.

The electro magnets 25 and 26 are for stopping the writing operation. When the magnet 26 is energized, the ratchet lever 27 is attracted, and the ratchet gear 28 is locked, thus the pulse motor 32 is disconnected from the roller 30. When the magnet 25 is energized, the write head 24 is attracted and the write head 24 is removed from the printing paper. Accordingly, when the receiving operation is not being performed, those magnets 25 and 26 are energized to prevent the supply of the printing paper, and when the receiving operation is performed, those magnets 25 and 26 are de-energized thus the printing operation becomes possible. The electro magnet 18 enables the read opration. When the original paper 12 inserted, the light beam from the light 14 does not reach the sensor 20, and the control circuit 21 cause the magnet 18 attract the lever 19, thus the original paper supply means 16 is lifted against the spring 17. Thus, a pair of rollers 29a and 29b and the corresponding rollers hold the original paper 12, which accomplishes the auxiliary scanning operation. Accordingly, energizing the magnet 18 enables the transmission operation, and when the transmission operation is not being performed, the magnet 18 is de-energized. It should be noted that those magnets 25, 26 and 18 are controlled by the control circuit 21. The switch 34 changes the operational mode of the system between the local mode and the communication mode, and the resistor 35 is the artificial circuit for the mode switching.

Figure 3:
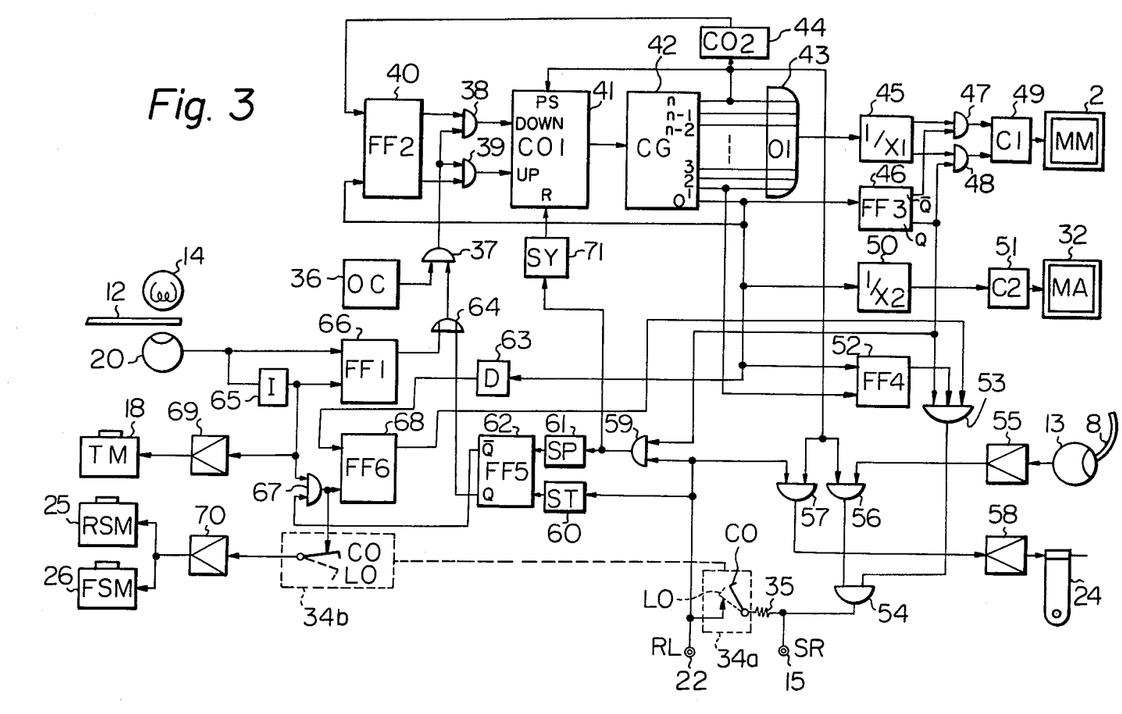
FIG. 3 is the circuit block-diagram of the control circuit of the facsimile apparatus in FIGS. 1 and 2.

FIG. 3 is the block-diagram of the main portion of the control circuit according to the present invention. The operation of the present facsimile system will be explained in accordance with FIG. 3 hereinafter.

(1) TRANSMISSION OPERATION

The present facsimile apparatus operates as a master station and sends a synchronization signal to the corresponding facsimile apparatus in a slave station. The transmission operation is initiated by the insertion of the original paper 12. The original paper 12 interrupts the light beam from the light 14 and thus the sensor 20 inverts the flip-flop 66, which opens the AND circuit 37 through the OR-circuit 64, thus the output pulses from the oscillator 36 are applied to the AND-circuits 38 and 39. The output from the sensor 20 is applied to the magnet 18 through the invertor 65 and the amplifier 69, thus the original paper supply means operates. The output of the flip-flop 40 is, first, applied to the 'UP' terminal of the counter 41 through the AND-circuit 39, and then the counter 41 increases the content of the same. The counter 41 cause the clock pulse generator 42 to provide the output clock pulses (0), (1), (2),,,,, (n), which are applied to the main scanning pulse motor 2 through the OR-circuit 43, the divider 45, AND-circuit 48 and the drive circuit 49, thus the pulse motor 2 is accelerated and decelerated. When the pulse "n" is reached by the clock pulse generator 42, a present signal is applied to the counter 41, and the clock pulse generator 42 provides the pulse "n" continuously, and the pulse motor 2 rotates at a constant speed. At the same time, the second counter 44 starts operation and counts the number of the pulses "n". The counter 44 counts the number of pulses applied to the motor 2 during each scanning cycle. When the content of the counter 44 reaches a predetermin value, the counter 44 inverts the condition of the flip-flop 40, and then the output of the oscillator 36 is applied to the "DOWN" input of the counter 41 through the AND-circuit 38. Accordingly, the clock pulse generator 42 provides the clock pulses (n), (n-1), (n-2), (n-3),,,,(2) and (1), which decelerats the pulse motor 2. When the clock generator 42 reaches the clock pulse (0), the flip-flop 40 is inverted and the AND-circuit 39 opened, thus the content of the counter 41 is increased again. The flip-flop 46 is also inverted and the AND-circuit 48 is closed and the AND-circuit 47 is opened. Then the pulse motor 2 rotates in the reverse direction. The transmission operation finishes when the sensor 20 detects the end of the original paper and inverts the flip-flop 66.

The synchronization signal is sent out from the flip-flop 52 through the AND-circuit 53, OR-circuit 54, and the output terminal 15, when the clock pulse (0) from the clock pulse generator 42 changes to the clock pulse (1). It should be noted that said AND-circuit 53 is opened only when the output Q of the flip-flop 46 is ON (which indicates that the carrier 1 in FIG. 1 is at point (a)), and the condition of the flip-flop 68 is ON, and the synchronization signal is sent out only at that time. That is to say, the synchronization signal is sent out for every trip of the carrier 1 beginning and ending at position d in FIG. 1 by the control of the flip-flop 46. The flip-flop 68 controls the synchronization signal which is sent either in transmission operation, or in case the receiving operation starts during the transmission operation, and that said receiving operation continues after the end of that transmission operation. The synchronization signal is stopped when the duration between the clock pulse (0) and the clock pulse (1) in the clock pulse generator 42, that is to say, the duration that the carrier 1 stays at the position (a) in FIG. 1, is longer than a predetermined interval (for instance, 0.5 seconds). When that condition occurs, the delay circuit 63 provides an output signal to the flip-flop 68, which is then inverted, and the AND-circuit 53 presents the transmission of the synchronization signal.

A picture signal or an information signal is transmitted when the clock pulse generator 42 provides the clock pulse (n) where the pulse motor 2 is rotating at a constant speed, and the AND-circuit 56 is opened. At that time, the picture signal generated at the read-head is sent to the output terminal 15 through the optical fiber 8, the photo detector 13, the amplifier 55, the AND-circuit 54. When the clock pulse from the clock pulse generator 42 is (0), that is to say, when the carrier 1 is at the extreme left or right end of its travel, the pulse motor 32 for the auxiliary scanning is driven through the divider 50 and the drive circuit 51, and the original paper 12 is fed. In the present transmission operation, the AND-circuit 67 is opened, so the magnets 25 and 26 are energized through the amplifier 70, thus the writing operation is prevented.

(2) RECEIVING OPERATION

In the receiving mode, the pesent facsimile appararus operates as a slave station and receives the synchronization signal from a master station (transmission station). The present facsimile apparatus is initiated in the receiving mode when the power source is switched on. The synchronization signal received at the input terminal 22 is detected by the signal test means 60, which causes the flip-flop 62 to open the AND-circuit 37 through the OR-circuit 64. Thus, the pulse motors 2 and 32 are driven similarly to the operation in the transmission mode described before. When the synchronization signal through the input terminal 22 is not received for a predetermined length of time (for instance 0.5 second), the signal test means 60 and 61 and the synchronization signal detector 71 operate, thus the flip-flop 62 is inverted and the receiving operation is stopped.

The synchronization signal received at the beginning of every scan of the carrier 1 from position d in FIG. 1 clears the content of the counter 41 through the synchronization signal detector 71 and the AND-circuit 59, which is opened by the signal from the output terminal Q of the flip-flop 46. Accordingly, the operation of the receiving station is synchronized with that of the transmission station on a start-stop synchronization principle, for in every return trip of the carrier 1. A picture signal following the synchronization signal received at the input terminal 22 is applied to the write head 24 through the amplifier 58 and the AND-circuit 57, which is opened when the clock pulse (n) is provided at the output of the clock pulse generator 42. When the synchronization signal is detected by the signal test means 61 and the flip-flop 62 is inverted, the output terminal $\overline{Q}$ of the flip-flop 62 becomes "0", thus the AND-circuit 67 is closed, and the magnets 25 and 26 are not energized. Accordingly, the writing operation is possible.

(3) THE RECEIVING OPERATION DURING THE TRANSMISSION OPERATION;

In this case, the present facsimile apparatus operates as a master station, and sends the synchronization signal to a slave station until both the transmission from the present apparatus and the reception from the slave station finish. When the signal is received by the station in the transmission mode described in the paragraph (1), that signal inverts the flip-flop 62 through the signal test means 60. Accordingly, the output terminals Q and $\overline{Q}$ of the flip-flop 62 have the outputs "1" and "0", respectively, thus the AND-circuit 67 is closed, and the magnets 25 and 26 are de-energized. So the printing paper 31 can be supplied and the write head 24 can write on the printing paper 31 (see FIG. 2). Since the "1" signal from the Q output of the flip-flop 62 is applied to the AND-circuit 37 through the OR-circuit 64, and AND-circuit 37 opens and thus the receiving operation is accomplished. When only the transmission operation is finished in the above situation, the sensor 20 causes the magnet 18 to be de-energized, thus the original paper supply means 16 (FIG. 2) is put in the lower position by the spring 17 (FIG. 2). Further, the flip-flop 66 is inverted. However, the AND-circuit 37 continues the open condition since the flip-flop 62 applies the output signal from the terminal Q to said AND-circuit 37 through the OR-circuit 64. Thus, the main scanning and the auxiliary scanning continue. It should be noted that the synchronization signal is transmitted to the receiving station in a slave mode through the AND-circuit 53, the OR-circuit 54 and the output terminal 15, since the flip-flop 68 is not inverted. As explained above, the synchronization signal generated in the master station serves both the transmission operation and the receiving operation in the master station, since no synchronization signal is received when the receiving operation begins during the transmission operation.

(4) THE TRANSMISSION OPERATION DURING THE RECEIVING OPERATION

The present facsimile apparatus works as a slave station in this case and does not send the synchronization signal. When the original paper 12 is inserted during the receiving operation, the sensor 20 detects the presence of the original paper, and the original paper supply means 16 (FIG. 2) is energized through the inverter 65 and the amplifier 69, thus the transmission operation is performed. Although only the receiving operation finishes in this case, the transmission operation continues by maintaining the main and the auxiliary scannings since the flip-flop 66 applys the signal to the AND-circuit 37. In this case, the output terminal Q of the flip-flop 62 is zero then the AND-circuit 67 is closed although the original paper is inserted. Accordingly, the output of the flip-flop 68 is zero, and the AND-circuit 53 is closed, thus the synchronization signal is not sent out.

(5) LOCAL OPERATION

In this mode, both the reading operation and the writing operation are accomplished within the present facsimile apparatus, thus the test of the apparatus can be performed, and the present facsimile apparatus can work as a copy machine. When the gang switch 34a and 34b is switched from the communication mode (CO) to the local mode (LO), the input terminal 22 is connected to the output terminal 15 through the artificial resistor 35, thus the transmitted signal is returned directly and is drawn on the printing paper. In this mode, the magnet 69 is energized and the magnets 25 and 26 are not energized, thus both the original paper and the printing paper are supplied.

Figure 4:
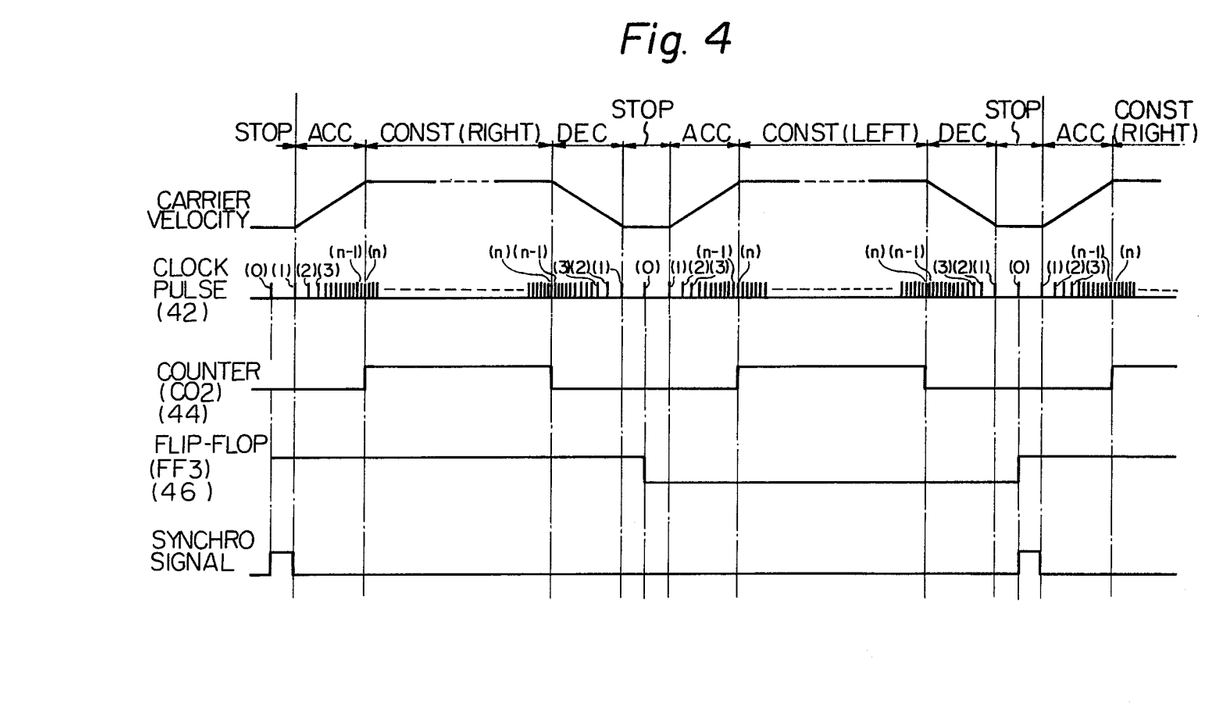
FIG. 4 is the operational curve for explaining the operation of the facsimile apparatus in FIGS. 1, 2 and 3.

FIG. 4 shows the operational time chart of the present facsimile apparatus. The carrier 1 stationary at the left extreme and in the initial state, starts, is accelerated, runs at a constant speed, is decelerated and is stopped at the right extreme end. And the carrier 1 then returns to its initial position through the acceleration, constant speed and the deceleration sequence. Each scanning cycle involves a pair of scannings from left to right and from right to left. The synchronization signal is sent out in every scanning cycle. The acceleration and the deceleration of the carrier 1 are controlled by the counter 41 and the clock pulse generator 42 in FIG. 3, and the duration that the pulse motor runs at a constant speed is defined by the number of pulses counted in the counter 44 (CO2, see FIG. 4). Said number of pulses during the constant speed depends upon the length that the carrier 1 moves by each pulse applied to the pulse motor. The transmission operation and the receiving operation are controlled by the clock pulses, and the difference in the period of the clock pulse in the transmission station and the period of the clock pulse in the receiving station is adjusted by the synchronization signal detector 71 which controls the counter 41.

Figure 5:
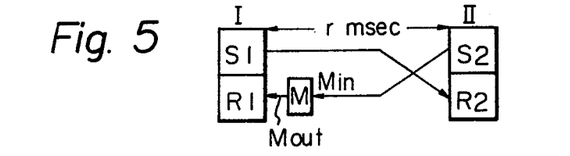
FIG. 5 and FIG. 6 show the structure and the operational time chart for explaining the effect of a signal delay in a transmission line.
Figure 6:
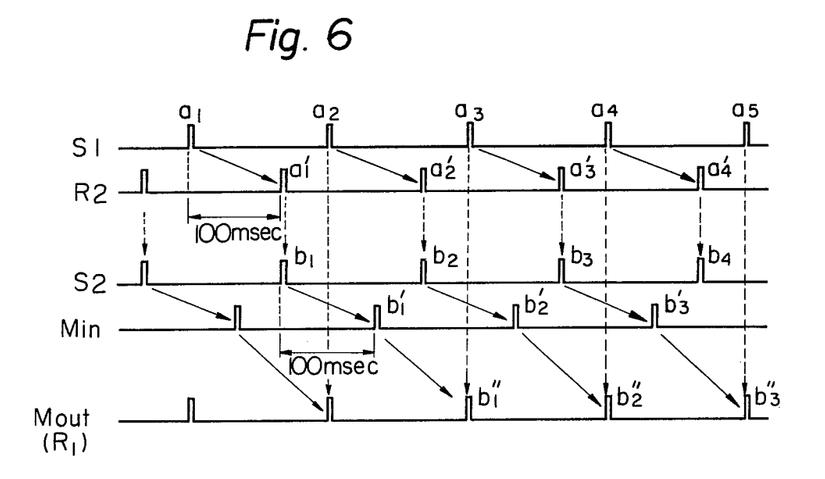

Now, synchronization when the distance between the master station and the slave station is very long, is explained below. When the transmission line between a master station and a slave station is long, such as an international transmission line, the time delay from the master station to the slave station and from the slave station to the master station disturbs the synchronized operation. In that case, a memory M (see FIG. 5) for delaying the synchronization signal and information signal is inserted in front of the receiving input terminal of the master station. The problem of the delay will be explained in accordance with FIG. 5 and FIG. 6. In FIG. 5, the station (I) is a master station and the station (II) is a slave station, and the delay between those two stations is supposed to be $r$ msec (for instance $r=100$ msec). When the transmitter $S_1$ in the master station sends the synchronization signal $a_1, a_2, a_3, a_4, a_5$,,,, (see FIG. 6) those synchronization signals are received by the receiver $R_2$ in the slave station after 100 msec as the pulse train $a_1', a_2', a_3', a_4'$,,,, as shown in FIG. 6. And the transmitter $S_2$ in the slave station takes those synchronization signals and sends the synchronization signals $b_1, b_2, b_3, b_4$,,,, to the master station (I). Those signals $b_i$ are received by the master station (I) after 100 msec of the transmission of those signals as $b_1', b_2', b_3'$,,,, at the input $M_{in}$ of the memory (M). The memory (M) delays the input signals by a pedetermined time, preferably 100 msec in the present case, and provides the output signals $M_{out}$ such as $b_1'', b_2'', b_3''$,,,, as shown in FIG. 6. The signals from $M_{out}$ are applied to the input terminal 22

FIG. 3 of the facsimile apparatus in the master station. It should be appreciated that the pulse train ($a_1, a_2, a_3, a_4, a_5,$) coincides completely with the pulse train ($b_1'', b_2'', b_3'' ,,,$) in the master station (I), and the pulse train ($a_1', a_2', a_3', a_4' ,,,,$) coincides with the pulse train ($b_1, b_2, b_3, b_4 ,,,$) in the slave station (II). Thus the complete synchronization operation can be performed in both the master and the slave stations. Since the write head and the read-head are supported on a single carrier and are driven together, if a sending synchronization signal does not coincide with a receiving synchronization signal, the present facsimile system can not operate correctly. It should be appreciated that the delay time in the memory (M) is to be designed to coincide the received synchronization signals with the sending synchronization signals in the master station.

Now, the structure of the read-head formed on the optical fiber will be explained in accordance with FIGS. 7 through 12.

Figure 7:
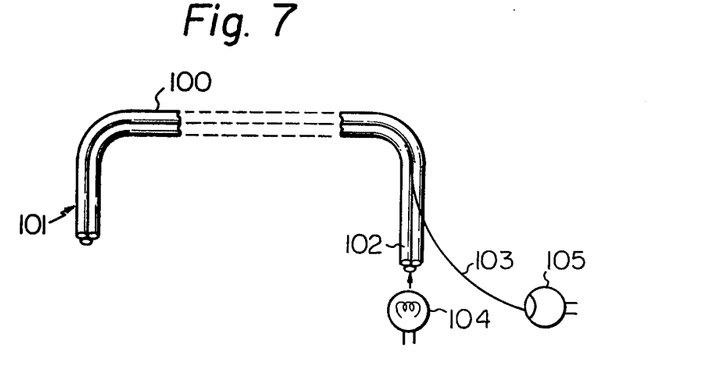
FIG. 7, FIG. 8, and FIG. 9 show the structure of a prior read-head.
Figure 8:
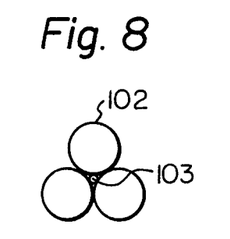
Figure 9:
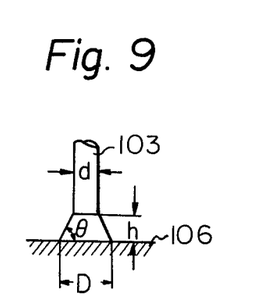

First, the prior read-head is explained in accordance with FIGS. 7, 8 and 9 for the easy understanding of the present invention. In the following explanation, the reference numerals are revised for the simple explanation of the invention.

FIG. 7 is a diagramatic illustration of the read-head of the prior art, which comprises a set of optical fibers consisting of one or more emission fibers and one single thin receiving fiber. As shown in FIG. 7, one end of said set of fibers forms a reader section 101 for reading information on the face of the original paper and at the other end thereof there are provided a light source 104 facing said emission fibers 102 and a light detector element 105 adjacent to said receiving fiber. FIG. 8 shows in a sectional view that the receiving fiber 103 is to be surrounded by the emission fibers 102. In FIG. 9, there is shown a relationship between the diameter, "$d$," of the receiving fiber 103 and the diameter, "D," of the reading area, effectively covered by the read-head 101, on the original paper 106. By designating "$h$" as the distance between the end of the receiving fiber 103 and the face of the original paper 106, the diameter, D, of the reading area on the original paper 106 should be expressed by the formula, $$D = d + 2h \cot \theta \qquad (1).$$

The resolving power of the read-head is obviously affected by the diameter D. In the conventional type of read-head, therefore, the diameter, $d$, of the receiving fiber 103 was required to be minimized so as to improve said resolving power. The receiving fiber in the prior read-head was exceedingly slender, as compared with the emission fiber, requiring the utmost care and high cost of assembly. There were further disadvantages such as the tensile force of such conventional receiving fiber was small and the attenuation of light passing through the thin fiber element was large.

Figure 10:
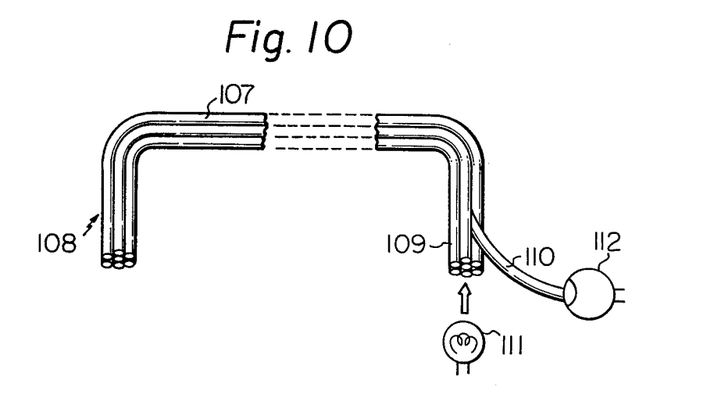
FIG. 10, FIG. 11, and FIG. 12 show the structure of the present read-head.
Figure 11:
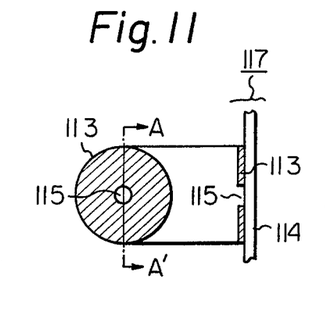
Figure 12:
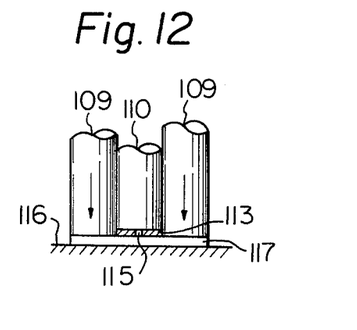

In FIGS. 10, 11 and 12, there is shown an embodiment of the read-head according to the present invention. The optical fibers 107 in the embodiment, one end of which forms a reader section 108, consist of one or more emission fibers and one receiving fiber, said emission fibers being positioned in relation to a light source 111 and said receiving fiber 110 is in contact with a light detector element 112. A mask plate 117 is fixed to the end of the reader section 108. As illustrated in FIGS. 11 and 12, the mask plate 117 is a transparent plate 114 made of for instance glass, on which an opaque film 113 having a small hole 115 is attached. The opaque film is attached on the plate by, for instance, a plating technique. Said small hole 115 on the opaque film 113 operates as a light beam receiving hole. The diameter $d'$ of the hole 115 can replace the value $d$ in the above formulas (1), then the diameter D of the reading area on the original paper is shown;

$$D = d' + 2h \cot \theta \qquad (2).$$

It should be appreciated that the value $d'$ can be much smaller than the value $d$ without affecting the strength of the optical fiber and the light attenuation in the optical fiber.

The masked plate 117 is so constructed and disposed that the film portion of said plate is in contact with the receiving fiber 110, the remaining portion thereof is touching the emission fibers 109. The under face of the transparent plate 114 is in contact with or the proximity of the face of the original paper, and accordingly, the light from the emission fibers is reflected by the paper surface and the reflected light passes through the hole 115 into the receiving fiber and is transmitted to the light detector element 112, thus enabling the reading of image information on the face of the original paper. In the operation of conventional-type optical fibers, the diameter of the receiving fiber was required to be small so as to obtain the resolving power required. According to the present invention, however, the adjustability of the small light-receiving hole in eliminating the disadvantage permits an optical fiber having a larger diameter to be used as the receiving fiber for any amount of resolving power required.

The application of the read-head in the present invention is not limited to the facsimile system, but is extremely wide. For example, the read-head is applicable to precise information reading, such as an OCR (Optical character recognition system).

As can obviously be seen from the above, there are numerous advantages of the present invention resulting from the provision of the receiving fiber of a great diameter and of the masked plate having a small light-receiving hole at one end thereof, including:

(1) Great strength obtained in the read-head;
(2) Simplified construction;
(3) Economy in cost resulting from the ease of assembling fiber members;
(4) Lowered light attenuation rate;
(5) Light-receiving hole in the masked plate made adjustable in size for varying the resolving power.

From the foregoing it will now be apparent that a new and improved read-head has been found. It should be understood of course that the embodiment disclosed is merely illustrative and is not intended to limit the scope of the invention. Reference should be made to the appended claims, rather than the specification as indicating the scope of the invention.

What is claimed is:

1. A read-head for reading an optical information on an original paper comprising an optical fiber assembly having a plurality of light emission fibers for emitting light onto the original paper and a light receiving fiber for receiving reflected light from said original paper, a transparent plate having an opaque film with a small hole mounted at the extreme end of said optical fiber assembly, the other extreme end of said light emission fiber and light receiving fiber in said optical fiber assemble being positioned in front of a light source and a light detector element, respectively, said transparent plate being positioned in contact with or near the original paper to be scanned.

2. The invention as defined in claim 1, wherein each of said light emission fiber is thicker than the receiving fiber.

3. The invention as defined in claim 1, wherein said optical fiber assemble is flexible.

* * * * *